(12) United States Patent
Mehta et al.

(10) Patent No.: US 10,085,279 B1
(45) Date of Patent: Sep. 25, 2018

(54) ESTIMATING AND USING UE TUNE-AWAY PERIOD BASED ON TIMING OF DETECTED MISSED COMMUNICATIONS FROM THE UE

(71) Applicant: Sprint Spectrum L.P., Overland Park, KS (US)

(72) Inventors: Dhaval Mehta, Aldie, VA (US); Jasinder P. Singh, Olathe, KS (US); Udit Thakore, Fairfax, VA (US); Yu Wang, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 27 days.

(21) Appl. No.: 15/449,896

(22) Filed: Mar. 3, 2017

(51) Int. Cl.
*H04W 4/00* (2018.01)
*H04W 72/12* (2009.01)
*H04W 8/00* (2009.01)
*H04W 28/02* (2009.01)
*H04W 88/08* (2009.01)

(52) U.S. Cl.
CPC ....... *H04W 72/1273* (2013.01); *H04W 8/005* (2013.01); *H04W 28/0205* (2013.01); *H04W 88/08* (2013.01)

(58) Field of Classification Search
CPC .......... H04L 2012/5608; H04W 84/12; H04W 88/08; H04W 80/04; H04W 84/18; H04W 88/06; H04W 74/08; H04W 36/18

USPC ...... 370/349, 310.2, 328, 338, 331
See application file for complete search history.

(56) References Cited

U.S. PATENT DOCUMENTS

| 8,879,506 | B1* | 11/2014 | Singh | H04W 36/0016 370/331 |
| 9,578,584 | B1* | 2/2017 | Oroskar | H04L 5/0007 |
| 2013/0260758 | A1 | 10/2013 | Zhao et al. | |
| 2013/0286853 | A1 | 10/2013 | Shi et al. | |
| 2014/0378152 | A1 | 12/2014 | Anand et al. | |
| 2015/0257199 | A1* | 9/2015 | Su | H04W 76/048 455/552.1 |
| 2016/0020819 | A1* | 1/2016 | Anand | H04W 72/0453 455/452.1 |

* cited by examiner

*Primary Examiner* — Brenda H Pham (57) ABSTRACT

When a base station is serving a user equipment device (UE) that tunes away from the base station during recurring tune-away periods, the base station will determine that the base station did not receive a communication expected to be received at a particular time from the UE. Based on the determining, the base station will estimate a first tune-away period of the UE's recurring tune-away periods to be a time period that encompasses the particular time. And based on the estimated first tune-away period, the base station will estimate times of subsequent tune-away periods. The base station will then configure itself such that it avoids communicating with the UE during the estimated times of the subsequent tune-away periods.

20 Claims, 4 Drawing Sheets

ESTIMATING AND USING UE TUNE-AWAY PERIOD BASED ON TIMING OF DETECTED MISSED COMMUNICATIONS FROM THE UE

BACKGROUND

A typical wireless communication system includes a number of base stations each radiating to provide one or more coverage areas or "sectors" in which to serve user equipment devices (UEs) such as cell phones, tablet computers, tracking devices, embedded wireless modules, and other wirelessly equipped devices, whether or not actually "user" operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a UE within coverage of the system may engage in air interface communication with a base station and may thereby communicate via the base station with various remote network entities or with other UEs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1xRTT and 1xEV-DO), Global System for Mobile Communications (GSM), IEEE 802.11 (WIFI), and BLUETOOTH. Each protocol may define its own procedures for registration of UEs, initiation of communications, handover between sectors, and other functions.

Further, each base station may provide wireless service to UEs on one or more carrier frequencies, with the air interface defining various downlink and uplink channels. For instance, on the downlink, the air interface may define a reference channel for carrying a reference signal (also referred to as a pilot signal, or by other names) that UEs can measure to evaluate base station coverage quality, the air interface may define various other downlink control channels for carrying control signaling to UEs, and the air interface may define one or more downlink traffic channels for carrying bearer data and other information to UEs. And on the uplink, the air interface may define an access channel for carrying UE access requests to the base station, the air interface may define one or more other uplink control channels for carrying control signaling to the base station, and the air interface may define one or more uplink traffic channels for carrying bearer data and other information to the base station.

When a UE initially enters into coverage of such a system, the UE may scan for a best sector in which to operate, and the UE may then engage in signaling with the base station that provides that sector, to register for service. In particular, the UE may evaluate a reference signal receive quality (RSRQ) of each base station reference signal that the UE detects, where the RSRQ defines a signal-to-noise ratio of the reference signal (e.g., a ratio of reference signal receive power to noise power, also referred to as SINR, SNR, C/I, Ec/Io, or by other names), and the UE may select the sector having the highest RSRQ. Alternatively or additionally, the UE may evaluate another coverage quality metric, such as reference signal receive power (RSRP), of each base station reference signal, and the UE may select the sector having the best (e.g., highest) such metric, perhaps in combination with the highest RSRQ. The UE may then engage in signaling with the associated base station, to register for service.

The UE may then be served by the base station in a connected state or an idle state. In the connected state, the UE would have an established radio-link-layer connection with the base station through which the UE and base station could exchange bearer data (e.g., application-layer communications), facilitating communication by the UE on an external transport network for instance. And in the idle state, the UE would not have an established radio-link-layer connection with the base station but may periodically check for paging from the base station and may transition to the connected mode when necessary to engage in bearer communication.

OVERVIEW

In a representative wireless communication system as described above, a UE could be configured to occasionally pause its operation with and tune away from its serving base station, and the UE could do so for a variety of reasons.

For instance, if the wireless communication system is a hybrid wireless communication system that includes at least two radio access networks (RANs), then the UE could occasionally tune away from one of the RANs to connect with and be served by a different RAN. An example of such a hybrid wireless communication system is one that includes a first RAN providing LTE service to support mobile broadband data communication and a second RAN providing legacy CDMA or GSM service to support traditional voice calls and/or other services. In such a system, a UE could connect with and be served by the LTE network by default, to facilitate engaging in data communication, and the UE could then tune away from the LTE network to the legacy network during recurring tune-away periods in order to monitor the legacy network for incoming voice calls or other legacy network services.

As another example, the UE could occasionally tune away from its serving base station to help ensure that the UE is served with sufficiently strong coverage and perhaps with the strongest available coverage. In practice, the UE could regularly monitor coverage strength of its serving sector and of neighboring sectors that extend to the UE's location, and if the coverage of the UE's serving sector becomes threshold weak or if coverage of another sector becomes threshold strong (e.g., threshold stronger than the serving sector's coverage or than a defined level), then the UE may hand over to the other sector (e.g., through signaling with its serving base station, or autonomously). In order to monitor the coverage strength of neighboring sectors, the UE may need to tune away from its serving base station if, for instance, the serving base station operates on a different carrier frequency or air interface protocol than a neighboring base station, as the UE may need to switch between carrier frequencies or radio interfaces in order to communicate with the neighboring base station.

A problem with the above arrangements can arise, however, if a base station attempts to communicate with the UE while the UE is tuned away from the base station, because communications transmitted from the base station to the UE while the UE is tuned away from the base station will not be received by the UE. When the UE fails to receive a communication from the base station, the base station can engage in one or more retransmission attempts of the communication at a later time. But this retransmission process can result in significant delay in the transmission of the communication and can also add unwanted air traffic congestion to the air interface of the wireless communication network. Accordingly, it is desirable for a base station to avoid attempting to communicate with a served UE during the UE's tune-away periods.

However, a base station might not be aware of the timing of the UE's tune-away periods. For example, in the hybrid wireless network above, the LTE network might not be configured to communicate with the legacy network. As such, the legacy network could be unable to specify to the LTE network when the UE is scheduled to tune to the legacy network to monitor for page messages. Additionally, in the above example in which the UE tunes away to search for optimal coverage, the UE could be configured to do so autonomously, such that the base station is unaware of the UE's tune-away periods. In any case, if the base station is unaware of the timing of the UE's tune-away periods, then the base station could end up unintentionally attempting to transmit data to the UE during one or more of the UE's tune-away periods, causing communication delays and increasing air traffic congestion as noted above.

Disclosed herein is an improved method and system to help address these or other issues. In accordance with the disclosure, a base station will estimate when a UE will tune away from the base station, and the base station will responsively avoid transmitting communications to the UE during those estimated times. In particular, if the base station expects to receive communications from the UE at particular times, and the base station does not receive one or more of these expected communications, then the base station could determine that the UE was tuned away from the base station during the times of the missed communications. Based on recurring times of the missed communications, the base station can thus estimate times of subsequent tune-away time periods, during which the base station expects the UE to tune away from the base station. For instance, the base station could determine a pattern of time periods that encompass the times of the missed communications, and the base station could estimate that subsequent tune-away time periods will occur in accordance with the determined pattern. The base station could then serve the UE while avoiding transmitting data to the UE during the estimated tune-away time periods, thereby reducing the risk of transmitting data to the UE while the UE is tuned away from the base station.

Accordingly, in one respect, disclosed is a method of controlling wireless communication over an air interface between a base station and a UE served by the base station, where the UE tunes away from the base station during recurring tune-away periods. In accordance with the disclosure, the method includes the base station determining that it did not receive a communication expected to be received at a particular time from the UE. Based at least in part on such a determination, the base station estimates a first tune-away period of the UE's recurring tune-away periods to be a time period that encompasses the particular time. The method further includes the base station estimating times of subsequent tune-away periods based at least in part on the estimated first tune-away period. The method then includes the base station configuring itself such that the base station avoids communicating with the UE during the estimated times of the subsequent tune-away periods.

In another respect, disclosed is another method of controlling wireless communication over an air interface between a base station and a UE served by the base station, where the UE tunes away from the base station during recurring tune-away periods. In accordance with the disclosure, the method includes the base station determining that it did not receive a first communication expected to be received at a first particular time from the UE. The method further includes the base station determining that it did not receive a second communication expected to be received at a second particular time from the UE. The method then includes the base station determining a pattern based at least on the first particular time and the second particular time and estimating times of the UE's recurring tune-away periods based on the determined pattern. Further, the method includes the base station configuring itself such that the base station avoids communicating with the UE during the estimated times of the UE's recurring tune-away periods.

And in still another respect, disclosed is a base station configured to control wireless communication over an air interface between the base station and a UE served by the base station, where the UE tunes away from the base station during recurring tune-away periods. In accordance with the disclosure, the base station includes an antenna structure for communicating with the UE over the air interface and a controller configured to carry out base station operations. By way of example, the base station operations could include determining that the base station did not receive a communication expected to be received at a particular time from the UE and, based on the determining, estimating a first tune-away period of the UE's recurring tune-away periods to be a time period that encompasses the particular time. The base station operations could further include estimating times of subsequent tune-away periods based on the estimated first tune-away period. Still further, the base station operations could include configuring the base station such that the base station avoids communicating with the UE during the estimated times of the subsequent tune-away periods.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus by way of example on a hybrid wireless communication system that includes LTE and CDMA access networks. It will be understood, however, that the specifics shown and described are intended only as examples, and that numerous variations are possible. For instance, some or all of the principles discussed can be applied in a non-hybrid wireless communication system or in a hybrid wireless communication system involving other types of access networks. Further, even within the examples disclosed, various elements (e.g. components and/or operations) can be rearranged, distributed, integrated, reordered, omitted, added, and otherwise modified.

Figure 1:
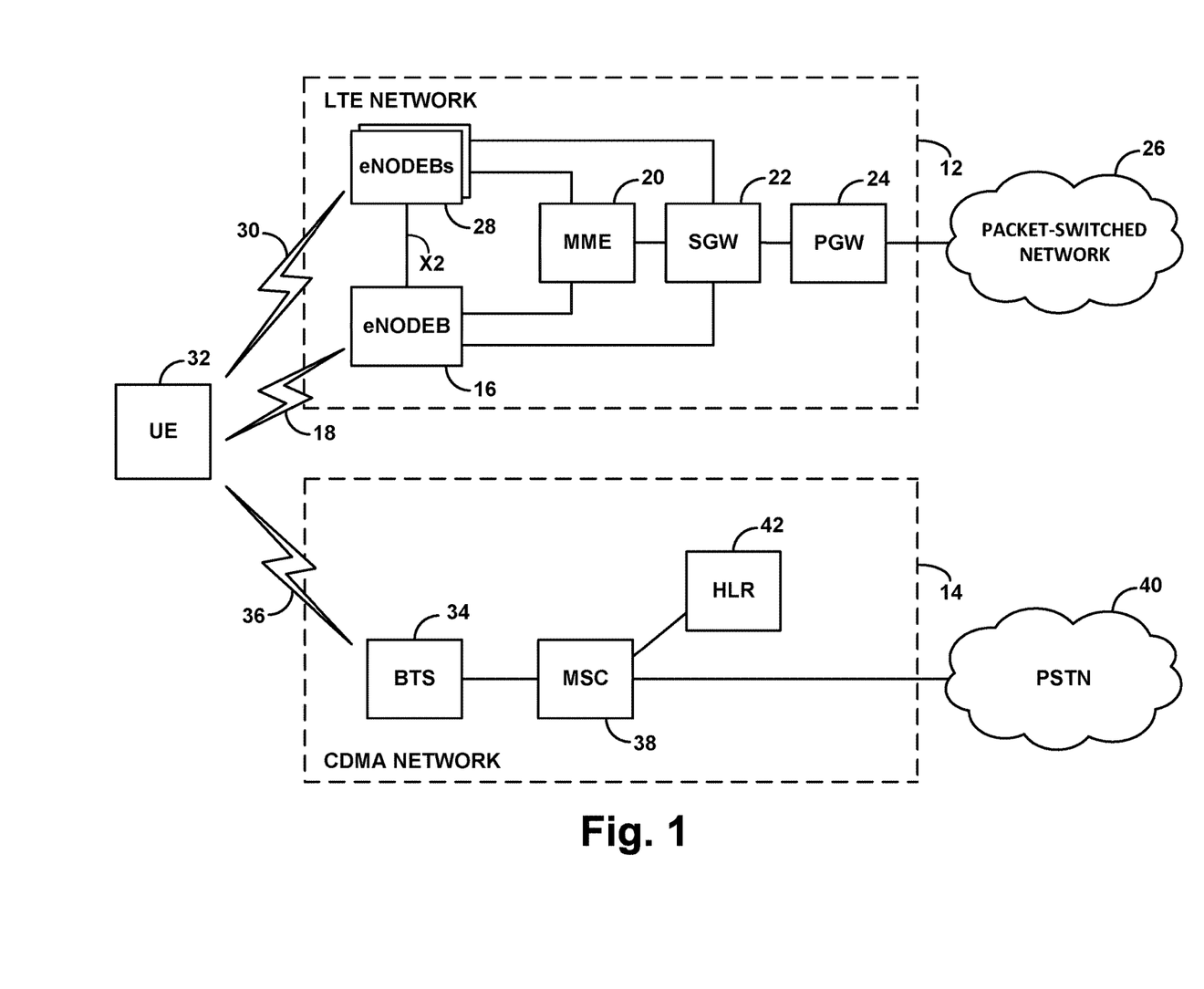
FIG. 1 is a simplified block diagram of an example wireless communication network in which features of the present disclosure can be implemented.

Referring to the drawings, FIG. 1 is a simplified block diagram of an example arrangement in which the present system and method can be implemented. As shown, the example arrangement includes an example LTE access network 12 and an example CDMA access network 14. The LTE network primarily serves UEs with wireless packet-data communication service (including perhaps voice-over-packet service and other packet-based real-time media service), and the CDMA network primarily serves UEs with circuit-switched voice call service (but may also provide packet-data communication service and other types of service).

As shown by way of example, the LTE network 12 includes a representative LTE base station (evolved Node B (eNodeB)) 16, which includes an antenna structure and associated equipment for engaging in LTE communication over an LTE air interface defining an LTE coverage area 18. The eNodeB then has an interface with a mobility management entity (MME) 20 that serves as a signaling controller for the LTE network. Further, the eNodeB and MME each have a respective interface with a serving gateway (SGW) 22, which then has an interface with a packet data network gateway (PGW) 24 that provides connectivity with a packet-switched network 26, such as the Internet.

As further shown, the LTE network could include one or more additional eNodeBs 28 neighboring eNodeB 16, and the neighboring eNodeBs 28 could be configured to provide one or more neighboring coverage areas 30. In this arrangement, eNodeB 16 could have communication interfaces with the neighboring eNodeBs 28, such as X2 interfaces, and the eNodeBs could be configured to communicate with each other over those interfaces. For instance, eNodeB 16 could communicate with neighboring eNodeBs 28 over an X2 interface in order to facilitate handover of a UE.

FIG. 1 further depicts a representative UE 32 within coverage of eNodeB 16 and its neighboring eNodeBs 28. When UE 32 first powers on or enters into coverage of the network, the UE may search for the strongest coverage it can find and, as noted above, may engage in a signaling process to register for service by the associated eNodeB. By way of example, we can assume that UE 32 detects a strongest reference signal from eNodeB 16 and thus engages in a process to register for service with eNodeB 16.

In a representative process, UE 32 may first engage in random-access signaling and radio-resource-control (RRC) configuration signaling with eNodeB 16 to establish an RRC connection as a radio-link-layer connection between the UE and the eNodeB. Through the RRC connection, the UE may then transmit an attach request to register with the LTE network, which eNodeB would forward to the MME. And upon authenticating the UE, the MME would then engage in signaling with the eNodeB and SGW (and, in turn, the SGW engages in signaling with the PGW), to set up for the UE one or more bearers for carrying packet data between the UE and the packet-switched network 26. The UE may then be served by the LTE network in a connected mode or an idle mode.

The CDMA network 14, on the other hand, is shown including a representative CDMA base station (base transceiver station (BTS)) 34, which includes an antenna structure and associated equipment for engaging in CDMA communication over a CDMA air interface defining a coverage area 36 co-located at least in part with the LTE coverage areas 18, 30. The BTS then has an interface, possibly through a base station controller (not shown), with a mobile switching center (MSC) 38 that serves as a signaling controller and switch for the CDMA network and that provides connectivity with the PSTN 40. And the MSC has an interface with a home location register (HLR) 42 that stores location and profile information for UEs.

With this arrangement, when UE 32 enters into coverage of the BTS, the UE may register with the CDMA network by transmitting a CDMA registration message over the CDMA air interface to the BTS, which the BTS would forward to the MSC, and which the MSC may forward to the HLR. Upon authenticating the UE, the HLR and MSC may then establish a record that the UE is served by BTS 34, and the UE may be served by the CDMA network in an active mode or an idle mode. Thereafter, when a call comes in for the UE from the PSTN and the UE is in the idle mode, the MSC would page the UE by transmitting a CDMA page message to the BTS for transmission over the CDMA air interface, the UE would send a page response via the CDMA air interface, and the MSC would connect the call to the UE via the UE's serving BTS and the CDMA air interface.

In practice, a UE that is equipped for both LTE and CDMA service (e.g., having a radio and associated components for selectively engaging in LTE service or CDMA service) may be configured to prefer LTE service by default. As such, when UE 32 is registered with both the LTE network and the CDMA network, the UE may by default tune to and be served by an eNodeB of the LTE network, such as eNodeB 16.

In line with the discussion above, as UE 32 is then served by eNodeB 16, the UE could then periodically tune away from the eNodeB during recurring tune-away periods. In some examples, the UE could tune away during the recurring tune-away periods in order to communicate with the CDMA network. For instance, when the CDMA network has an incoming call to connect to the UE, the CDMA network transmits a page message to the UE via the CDMA air interface. As such, the UE could be configured to tune away from eNodeB 16 to BTS 34 during recurring tune-away periods in order to monitor the CDMA network for page messages. If the UE detects a page message during a tune-away period, then the UE could respond to the detected page message, and the CDMA network could set up and serve the UE with the call via the CDMA air interface. If the UE does not detect a page message during the tune-away period, then at the end of the tune-away period the UE could tune back to and resume service with eNodeB 16. In a particular example, the UE could tune to the CDMA paging channel once every 5.12 seconds, but other examples are possible as well.

As further noted above, the UE could tune away during the recurring tune-away periods in order to ensure that the UE is operating in the best coverage area. For instance, UE 32 could monitor coverage strength from eNodeB 16 and could also tune away during recurring tune-away periods from eNodeB 16 to one or more other base stations of the LTE network or the CDMA network in order to monitor coverage strength from the other base stations and perhaps hand over to one of the other base stations based on the detected coverage strength. Other examples are possible as well.

In any case, eNodeB 16 could be unaware of the timing of the UE's recurring tune-away periods and, consequently while serving the UE, the eNodeB could attempt to transmit data to the UE during one of the tune-away periods. Any data transmitted during a tune-away period would not be received by the UE, and the eNodeB could end up engaging in a number of retransmission attempts, thereby delaying transmission of the data and increasing congestion on the air interface. Accordingly, the eNodeB could be configured to estimate when the UE's recurring tune-away periods will occur and avoid transmitting data to the UE during those estimated periods.

In practice, while UE 32 is tuned away from eNodeB 16, the UE does not send any communications to the eNodeB. As such, if the eNodeB expects to receive a communication from the UE at a particular time and the eNodeB does not receive that expected communication, then the eNodeB could infer that the UE was tuned away from the eNodeB at the particular time.

An expected communication could be any communication that the eNodeB would normally expect to receive from the UE if the UE does not tune away from the eNodeB. Under normal operation, the eNodeB could periodically receive various messages from the UE at a predefined frequency and from a predefined time. For example, when serving the UE, the eNodeB could specify a time at which the UE is to transmit a particular type of message to the eNodeB, and the eNodeB could further specify a frequency at which the UE is to transmit that particular type of message to the eNodeB. In this manner, the eNodeB would expect to receive periodic messages from the UE at times that occur at the specified frequency after the specified time. If the eNodeB does not receive one of these periodic messages according to the specified frequency, then the eNodeB could infer that the UE was tuned away from the eNodeB at the time that the missed periodic message was expected to be received by the eNodeB.

The periodic messages received from the UE could take various forms. As noted above, for instance, the UE could regularly monitor the quality of the eNodeB's coverage to ensure that the UE is operating under the best coverage, and part of this process could involve providing the eNodeB with channel-quality reports to enable the eNodeB to adapt its air interface transmission with the UE. In particular, the UE could regularly establish and report to the eNodeB a channel quality indication (CQI) based on coverage quality (e.g., signal-to-noise ratio) and other channel attributes. Thus, in one example, the expected communication could be one of a number of CQI messages that the eNodeB regularly receives from the UE.

In another example, the periodic messages could include an uplink reference signal that the UE periodically transmits to the eNodeB. For instance, the UE could regularly transmit to the eNodeB an uplink reference signal that the eNodeB could use to evaluate channel quality and timing characteristics of the uplink. In LTE, the uplink reference signal is a sounding reference signal (SRS), which the UE transmits periodically on certain defined uplink air interface resources. Thus, the eNodeB could expect to receive an SRS at a time corresponding to one or more of the defined uplink air interface resources, and if the eNodeB does not receive the expected SRS, then the eNodeB could infer that the UE was tuned away from the eNodeB at that time.

In yet another example, the UE could engage in periodic transmission of bearer data while being served by the eNodeB. For instance, when the UE is engaging in voice-over-IP (VoIP) communication, the eNodeB could apply semi-persistent scheduling (SPS) by allocating to the UE a periodically recurring block of air interface resources, and the UE could then accordingly transmit VoIP data packets in each periodic recurrence of the resource block. Thus, if the eNodeB does not receive any data from the UE during one of these periodically recurring resource blocks, then the eNodeB could infer that the UE was tuned away from the eNodeB during that resource block.

In other examples, the expected communication from the UE to the eNodeB might not be one of a number of periodically recurring messages. For instance, when the UE has data to transmit to the eNodeB, the UE could transmit a scheduling request to the eNodeB on a sub-channel of the uplink, such as on a physical uplink control channel (PUCCH), and the eNodeB could allocate resources for the data in a particular subframe of another sub-channel of the uplink, such as on a physical uplink shared channel (PUSCH). The UE could then transmit the data in the allocated resources of the PUSCH. As such, when the eNodeB allocates resource blocks in a particular subframe of the PUSCH, the eNodeB expects to receive the corresponding data from the UE. Thus, if the eNodeB does not receive any data from the UE during one of these allocated resource blocks, then the eNodeB could infer that the UE was tuned away from the eNodeB during that resource block.

In any case, once the eNodeB determines that it did not receive from the UE a communication that was expected at a particular time, the eNodeB could estimate the timing of one or more of the UE's recurring tune-away periods. In particular, the eNodeB could estimate the recurring tune-away periods to include a time period that encompasses the particular time at which the communication was expected to be received. The estimated time period could have a start time that precedes the particular time and an end time that follows the particular time. And the duration of the estimated time period could be a predefined duration long enough to encompass the duration of a typical UE tune-away period, such as 100 milliseconds. In other examples, the predefined duration could be longer or shorter.

Based at least in part on this estimated time period, the eNodeB could also estimate future occurrences of the UE's recurring tune-away periods. In particular, the eNodeB could estimate the recurring tune-away periods to include subsequent time periods that follow the estimated time period at a predefined frequency. For example, as noted above, the UE could be configured to tune away from the eNodeB every 5.12 seconds or so to monitor a CDMA paging channel, and so the eNodeB could estimate the subsequent time periods to follow the estimated time period at a frequency of one time period every 5.12 seconds. Other examples are possible as well.

Further, the eNodeB could determine that it missed multiple expected communications from the UE, and the eNodeB could estimate future occurrences of the UE's recurring tune-away periods based on the multiple missed communications. As an example, the eNodeB could determine that it missed from the UE both a first communication expected to be received at a first time and a second communication expected to be received at a second time. The eNodeB could then determine a pattern based on a time difference between the first and second missed communications, and the eNodeB could estimate the UE's recurring tune-away periods to include subsequent time periods that occur in accordance with the determined pattern. For instance, the eNodeB could determine an amount of elapsed time from the first missed communication to the second missed communication. And the eNodeB could estimate that the subsequent tune-away periods will repeatedly follow the second missed communication at a periodicity equal to the determined amount of elapsed time.

In some examples, the eNodeB could estimate the periodicity of the subsequent tune-away periods to be a fraction of the elapsed time, such as a half, a third, or a quarter of the elapsed time. This could be advantageous in situations where the detected missed communications do not fall within sequentially adjacent tune-away periods. For example, the UE could be configured to tune away from the eNodeB once every 5.12 seconds, but if the eNodeB does not detect a missed communication during one of the tune-away periods, then the eNodeB might only detect missed communications that occur 10.24 seconds apart. As such, the eNodeB could estimate the periodicity of the tune-away periods to be half of the elapsed time between the detected missed communications. Other examples are possible as well.

Further, while the above examples involve determining a pattern based on only two missed communications, in other examples the eNodeB could determine the pattern based on three or more missed communications.

Once the eNodeB estimates the future occurrences of the UE's recurring tune-away periods, the eNodeB could configure itself to avoid communicating with the UE during the estimated time periods. In particular, the eNodeB could avoid transmitting data to the UE at any time that falls within the estimated tune-away time periods, thereby reducing the likelihood that the transmissions will occur while the UE is tuned away from the eNodeB. This, in turn, could reduce the number of failed transmissions from the eNodeB to the UE, thereby reducing delays and air interface congestion associated with retransmitting failed communications.

In some examples, the eNodeB could also avoid scheduling uplink data transmissions from the UE to occur during the estimated tune-away time periods. When the UE is tuned away from the eNodeB, the UE is unable to transmit data to the eNodeB. Thus, any uplink data scheduled for transmission during one of the UE's tune-away periods will not be transmitted by the UE, and the eNodeB could end up having to reschedule the transmission of the uplink data. Accordingly, by avoiding scheduling uplink data transmissions from the UE to occur during the estimated tune-away time periods, the eNodeB could reduce the number of failed transmissions from the UE to the eNodeB, thereby reducing delays and air interface congestion associated with retransmitting failed communications.

Figure 2:
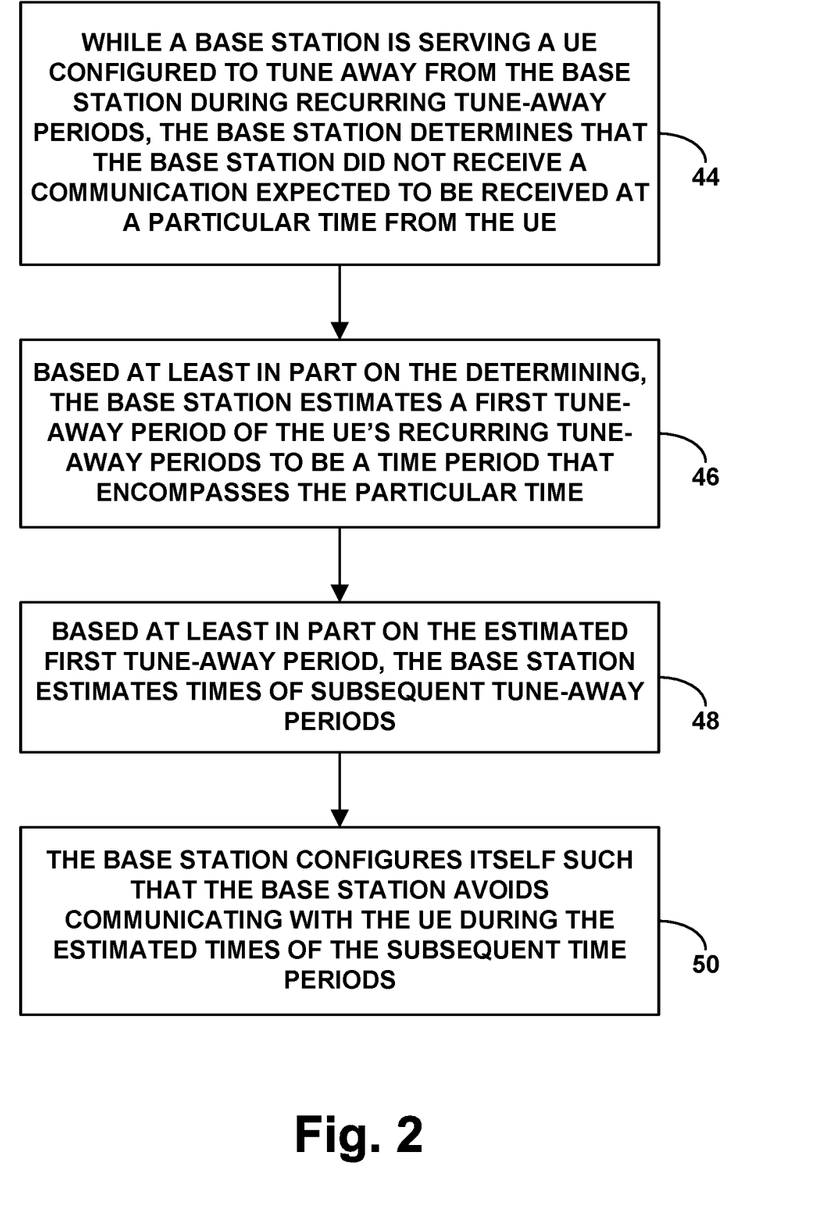
FIG. 2 is a flow chart depicting operations that can be carried out in accordance with the disclosure.

FIG. 2 is next a flow chart depicting a method that could be carried out by a representative base station serving a UE that tunes away from the base station during recurring tune-away periods. As shown in FIG. 2, at block 44, the method involves the base station determining that it did not receive a communication expected to be received at a particular time from the UE. At block 46, the method then involves, based at least in part on the base station determining that it did not receive the expected communication from the UE, the base station estimating a first tune-away period of the UE's recurring tune-away periods to be a time period that encompasses the particular time. Then at block 48, the method involves the base station estimating, based at least in part on the estimated first tune-away period, times of subsequent tune-away periods. And at block 50, the method involves the base station configuring itself to avoid communicating with the UE during the estimated times of the subsequent time periods.

In line with the discussion above, the base station could be configured to receive various recurring uplink communications, such as a CQI communication, an SRS communication, an SPS communication, or the like, from the UE at a predefined frequency starting from a predefined time, and the expected communication could be one of these recurring communications. In other examples, the expected communication could be a non-recurring uplink communication scheduled by the base station, such as a bearer data scheduled for transmission on a PUSCH, as noted above.

Further, in line with the discussion above, the estimated first tune-away period could be a time period having a predefined duration (e.g., 100 milliseconds), and the base station could estimate the subsequent tune-away periods to also have the predefined duration and to occur repeatedly after the first tune-away period at a predefined frequency (e.g., every 5.12 seconds).

Figure 3:
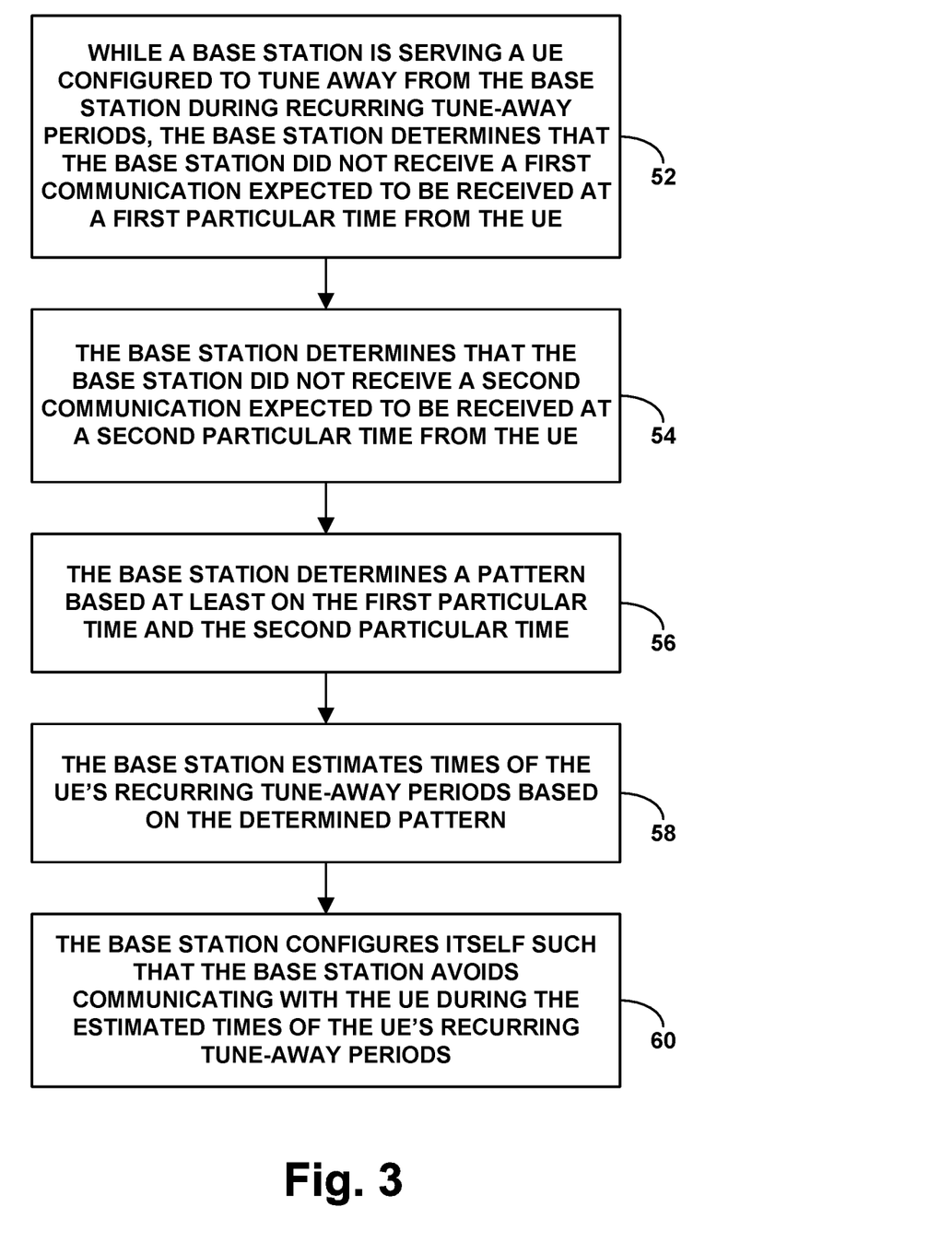
FIG. 3 is another flow chart depicting operations that can be carried out in accordance with the disclosure.

FIG. 3 is next another flow chart depicting an alternative embodiment of the method, again as may be carried out by a representative base station serving a UE that tunes away from the base station during recurring tune-away periods. As shown in FIG. 3, at block 52, the method involves the base station determining that it did not receive a first communication expected to be received at a first particular time from the UE. At block 54, the method then involves the base station determining that it did not receive a second communication expected to be received at a second particular time from the UE. Then, at block 56, the method involves the base station determining a pattern based at least on the first particular time and the second particular time. At block 58, the method further involves the base station estimating times of the UE's recurring tune-away periods based on the determined pattern. And at block 60, the method involves the base station configuring itself to avoid communicating with the UE during the estimated times of the UE's recurring tune-away periods.

In line with the discussion above, determining the pattern based on the first and second particular times could involve the base station determining an amount of elapsed time from the first particular time to the second particular time, and estimating the times of the recurring tune-away periods based on the determined pattern could involve the base station estimating the recurring tune-away periods to have a periodicity that is equal to the determined amount of elapsed time or a fraction (e.g., one half, one third, or one quarter) of the determined amount of elapsed time.

Figure 4:
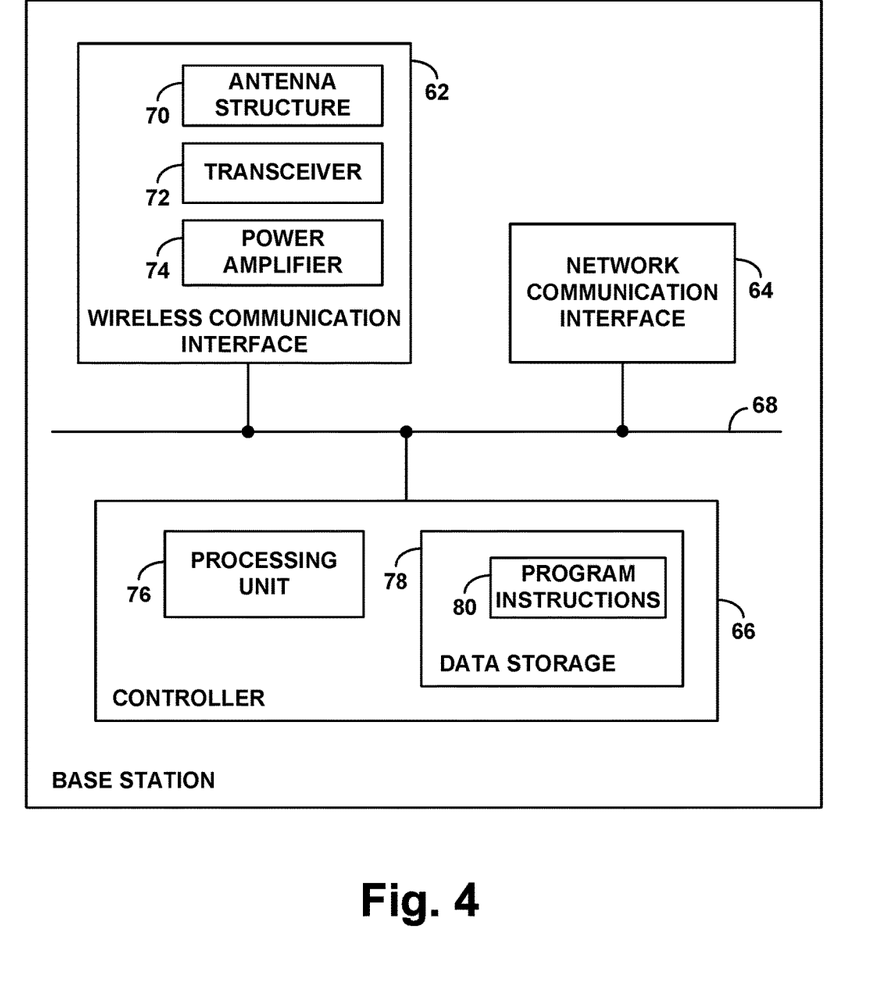
FIG. 4 is a simplified block diagram of an example base station operable in accordance with the disclosure.

Finally, FIG. 4 is a simplified block diagram of a base station, showing some of the components that such an entity may include in order to carry out these and other operations. As shown, the example base station includes a wireless communication interface 62, a network communication interface 64, and a controller 66, all of which could be integrated together in various ways or, as shown, interconnected with each other through a system bus, network, or other connection mechanism 68.

Wireless communication interface 62 includes an antenna structure (e.g., one or more antennas or antenna elements) 70, which could be tower mounted or provided in some other manner, configured to transmit and receive over the air interface and thereby facilitate communication with served UEs. Further, the wireless communication interface includes a transceiver 72 and power amplifier 74 supporting air interface communication according to the LTE protocol. Network communication interface 64 may then comprise one or more wired and/or wireless network interfaces (such as an Ethernet interface) through which the base station may engage in communication with other base stations and with various network infrastructure.

Controller 66, which may be integrated with wireless communication interface 62 or with one or more other components of the base station, may then be configured to manage communication over the air interface, including communicating with a UE that tunes away from the base station during recurring tune-away periods, in accordance with the present disclosure. By way of example, controller 66 is shown including a processing unit (e.g., one or more microprocessors or other processors) 76, data storage (e.g., one or more volatile and/or non-volatile non-transitory storage components, such as magnetic, optical, and/or flash storage) 78, and program instructions 80 stored in the data storage 78, executable by the processing unit 76 to carry out various disclosed base station operations.

By way of example, controller 66 may be configured to (i) determine that the base station did not receive a communication expected to be received at a particular time from the UE, (ii) based on the determining, estimating a first tune-away period of the UE's recurring tune-away periods to be a time period that encompasses the particular time, (iii) based on the estimated first tune-away period, estimating times of subsequent tune-away periods, and (iv) configuring the base station to avoid communicating with the UE during the estimated times of the subsequent tune-away periods.

Exemplary embodiments have been described above. Those skilled in the art will understand, however, that changes and modifications may be made to these embodiments without departing from the true scope and spirit of the invention.

What is claimed is:

1. A method of controlling wireless communication over an air interface between a base station and a user equipment device (UE) served by the base station, wherein the UE tunes away from the base station during recurring tune-away periods, the method comprising:
   determining that the base station did not receive a communication expected to be received at a particular time from the UE;
   based at least in part on the determining, estimating, by the base station, a first tune-away period of the UE's recurring tune-away periods to be a time period that encompasses the particular time;
   based at least in part on the estimated first tune-away period, estimating, by the base station, times of subsequent tune-away periods; and
   the base station configuring itself such that the base station avoids communicating with the UE during the estimated times of the subsequent tune-away periods.

2. The method of claim 1, wherein the communication is a first communication and the particular time is a first particular time, the method further comprising:
   determining that the base station did not receive a second communication expected to be received at a second particular time from the UE; and
   the base station estimating a second tune-away period of the UE's recurring tune-away periods to be a second time period that encompasses the second particular time, wherein the base station estimates the times of the subsequent tune-away periods based at least further in part on the estimated second tune-away period.

3. The method of claim 2, wherein estimating the times of the subsequent tune-away periods comprises:
   determining a pattern based at least on the first particular time and the second particular time; and
   estimating the times of the subsequent tune-away periods based on the determined pattern.

4. The method of claim 1, wherein estimating the first tune-away period of the UE's recurring tune-away periods further comprises excluding from the time period any times at which the base station has received a communication from the UE.

5. The method of claim 1, wherein estimating the first tune-away period of the UE's recurring tune-away periods to be a time period that encompasses the particular time comprises estimating the time period to have a predefined duration with a start time that precedes the particular time and an end time that follows the particular time.

6. The method of claim 5, wherein the predefined duration is 100 milliseconds.

7. The method of claim 1, wherein the base station is configured to receive periodic communications from the UE at a predefined frequency starting from a predefined time, and wherein the communication expected to be received at the particular time is one of the periodic communications.

8. The method of claim 7, wherein the communication expected to be received at the particular time comprises a channel quality indicator (CQI) communication.

9. The method of claim 7, wherein the communication expected to be received at the particular time comprises a sounding reference signal (SRS) communication.

10. The method of claim 1, wherein the communication expected to be received at the particular time comprises a communication scheduled using semi-persistent scheduling (SPS).

11. The method of claim 1, wherein the communication expected to be received at the particular time comprises a communication scheduled on a physical uplink shared channel (PUSCH).

12. The method of claim 1, wherein the base station is an evolved Node B (eNodeB) of a Long Term Evolution (LTE) network, and wherein the UE tunes away from the eNodeB during the recurring tune-away periods to scan for messages on a code division multiple access (CDMA) network.

13. A method of controlling wireless communication over an air interface between a base station and a user equipment device (UE) served by the base station, wherein the UE tunes away from the base station during recurring tune-away periods, the method comprising:
   determining that the base station did not receive a first communication expected to be received at a first particular time from the UE;
   determining that the base station did not receive a second communication expected to be received at a second particular time from the UE;
   determining a pattern based at least on the first particular time and the second particular time;
   estimating times of the UE's recurring tune-away periods based on the determined pattern; and
   the base station configuring itself such that the base station avoids communicating with the UE during the estimated times of the UE's recurring tune-away periods.

14. A base station configured to control wireless communication over an air interface between the base station and a user equipment device (UE) served by the base station, wherein the UE tunes away from the base station during recurring tune-away periods, the base station comprising:
   an antenna structure for communicating with the UE over the air interface; and
   a controller configured to carry out operations comprising (i) determining that the base station did not receive a communication expected to be received at a particular time from the UE; (ii) based on the determining, estimating a first tune-away period of the UE's recurring tune-away periods to be a time period that encompasses the particular time; (iii) based on the estimated first tune-away period, estimating times of subsequent tune-away periods; and (iv) configuring the base station such that the base station avoids communicating with the UE during the estimated times of the subsequent tune-away periods.

15. The base station of claim 14, wherein the communication is a first communication and the particular time is a first particular time, the operations further comprising:
 determining that the base station did not receive a second communication expected to be received at a second particular time from the UE; and
 estimating a second tune-away period of the UE's recurring tune-away periods to be a second time period that encompasses the second particular time, wherein the controller estimates the times of the subsequent tune-away periods based at least further in part on the estimated second tune-away period.

16. The base station of claim 15, wherein estimating the times of the subsequent tune-away periods comprises:
 determining a pattern based at least on the first particular time and the second particular time; and
 estimating the times of the subsequent tune-away periods based on the determined pattern.

17. The base station of claim 14, wherein estimating the first tune-away period of the UE's recurring tune-away periods further comprises excluding from the time period any times at which the base station has received a communication from the UE.

18. The base station of claim 14, wherein estimating the first tune-away period of the UE's recurring tune-away periods to be a time period that encompasses the particular time comprises estimating the time period to have a predefined duration with a start time that precedes the particular time and an end time that follows the particular time.

19. The base station of claim 14, wherein the base station is configured to receive periodic communications from the UE at a predefined frequency starting from a predefined time, and wherein the communication expected to be received at the particular time is one of the periodic communications.

20. The base station of claim 19, wherein the communication expected to be received at the particular time comprises a channel quality indicator (CQI) communication or a sounding reference signal (SRS) communication.

\* \* \* \* \*